(12) United States Patent
Yeggina et al.

(10) Patent No.: US 11,156,663 B2
(45) Date of Patent: Oct. 26, 2021

(54) GENERATING A TEST SEQUENCE OF CODE BASED ON A DIRECTED SEQUENCE OF CODE AND RANDOMLY SELECTED INSTRUCTIONS

(71) Applicant: Arm Limited, Cambridge (GB)

(72) Inventors: Deepak Yeggina, Bangalore (IN); Uma Renuka Subramanyam Pitchuka, Bangalore (IN)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/658,496

(22) Filed: Oct. 21, 2019

(65) Prior Publication Data

US 2020/0125484 A1 Apr. 23, 2020

(30) Foreign Application Priority Data

Oct. 23, 2018 (GB) ...................................... 1817213

(51) Int. Cl.
| | |
|---|---|
| *G06F 9/44* | (2018.01) |
| *G01R 31/3183* | (2006.01) |
| *G06F 8/30* | (2018.01) |
| *G06F 11/36* | (2006.01) |
| *G06F 9/46* | (2006.01) |
| *G06F 8/60* | (2018.01) |

(Continued)

(52) U.S. Cl.
CPC ....... *G01R 31/318385* (2013.01); *G06F 8/30* (2013.01); *G06F 8/60* (2013.01); *G06F 9/46* (2013.01); *G06F 11/366* (2013.01); *G06F 11/3684* (2013.01); *G06F 11/3688* (2013.01); *G06F 21/14* (2013.01); *G09C 1/00* (2013.01)

(58) Field of Classification Search
CPC ........ G06F 11/366; G06F 30/33; G06F 21/14; G06F 11/3684; G06F 8/60; G06F 11/263; G06F 9/46; G06F 11/3688; G06F 8/30; G09C 1/00; G06Q 20/4012; G01R 31/318385

See application file for complete search history.

(56) References Cited

U.S. PATENT DOCUMENTS

| | | | |
|---|---|---|---|
| 3,781,829 A | 12/1973 | Singh | |
| 5,196,840 A * | 3/1993 | Leith .................. | G06Q 20/4012 340/5.26 |

(Continued)

OTHER PUBLICATIONS

Combined Search and Examination Report for GB1817213.0, dated Apr. 16, 2019, 6 pages.

(Continued)

*Primary Examiner* — Tuan A Vu
(74) *Attorney, Agent, or Firm* — Nixon & Vanderhye P.C.

(57) ABSTRACT

A method, apparatus and computer program for generating a test sequence of code 108 are described, the test sequence of code to be run on a target processing system 106 for use in testing the target processing system. The test sequence of code is based on one or more directed sequences of code 102, in which the one or more directed sequences of code are predetermined sequences of one or more directed instructions for testing predetermined parts of the target processing system. The method includes, for at least one of the one or more directed sequences of code, inserting randomly selected instructions at one or more insertion points in the directed sequence of code.

17 Claims, 7 Drawing Sheets

(51) Int. Cl.
  *G09C 1/00*       (2006.01)
  *G06F 21/14*      (2013.01)

(56) References Cited

U.S. PATENT DOCUMENTS

| | | | |
|---|---|---|---|
| 7,689,958 B1* | 3/2010 | Ball | G06F 30/33 |
| | | | 716/124 |
| 2004/0003210 A1* | 1/2004 | Duale | G06F 11/263 |
| | | | 712/227 |
| 2004/0199363 A1* | 10/2004 | Bohizic | G06F 9/46 |
| | | | 702/186 |
| 2005/0015686 A1* | 1/2005 | Atoji | G06F 11/263 |
| | | | 714/100 |
| 2005/0204348 A1* | 9/2005 | Horning | G06F 21/14 |
| | | | 717/140 |
| 2005/0273631 A1* | 12/2005 | Shu | G09C 1/00 |
| | | | 713/190 |
| 2006/0150154 A1 | 7/2006 | Craske et al. | |
| 2006/0195681 A1 | 8/2006 | Craske et al. | |
| 2007/0136385 A1* | 6/2007 | Abrashkevich | G06F 11/366 |
| 2008/0307006 A1* | 12/2008 | Lee | G06F 11/3684 |
| 2020/0092303 A1* | 3/2020 | Murali | G06F 8/60 |

OTHER PUBLICATIONS

Examination Report for GB Application No. 1817213.0 dated Dec. 3, 2020, 2 pages.

* cited by examiner

GENERATING A TEST SEQUENCE OF CODE BASED ON A DIRECTED SEQUENCE OF CODE AND RANDOMLY SELECTED INSTRUCTIONS

This application claims priority to GB Patent Application No. 1817213.0 filed 23 Oct. 2018, the entire contents of which is hereby incorporated by reference.

The present technique relates to testing of a target processing system.

In many systems, it is useful to be able to test the functional correctness of a processing system, particularly if the target processing system is to be used in a safety critical environment. For example, testing of the target processing system may involve checking the function of various micro-architectural features of the processing system, such as registers, caches, translation look-aside buffers (TLBs) and the memory management unit (MMU). A test sequence of code may be executed on the target processing system to test micro-architectural aspects of the target processing system.

Viewed from a first example of the present technique, there is provided a method of generating a test sequence of code to be run on a target processing system for use in testing the target processing system, in which:

the test sequence of code is based on one or more directed sequences of code, in which the one or more directed sequences of code are predetermined sequences of one or more directed instructions for testing predetermined parts of the target processing system; and the method comprises, for at least one of the one or more directed sequences of code, inserting randomly selected instructions at one or more insertion points in the directed sequence of code.

Viewed from a further example of the present technique, there is provided a computer program which when executed on a computer causes the computer to generate a test sequence of code to be run on a target processing system for use in testing the target processing system, in which:

the test sequence of code is based on one or more directed sequences of code, in which the one or more directed sequences of code are predetermined sequences of one or more directed instructions for testing predetermined parts of the target processing system; and the test sequence of code is generated by, for at least one of the one or more directed sequences of code, inserting randomly selected instructions at one or more insertion points in the directed sequence of code.

Viewed from a further example of the present technique, there is provided a computer-readable storage medium storing the computer program described above. The storage medium may be a non-transitory storage medium.

Viewed from a further example of the present technique, there is provided an apparatus comprising test code generation circuitry configured to perform the method described above.

Viewed from a further example of the present technique, there is provided a computer-readable storage medium storing the test sequence of code generated by the method. The storage medium may be a non-transitory storage medium.

Further aspects, features and advantages of the present technique will be apparent from the following description of examples, which is to be read in conjunction with the accompanying drawings, in which.

Before discussing the embodiments with reference to the accompanying figures, the following description of example embodiments and associated advantages is provided.

A target processing system can be tested in a number of ways. For example, the target processing system can be tested by generating a directed sequence of code to be executed by the target processing system, the directed sequence being a sequence of instructions designed to test particular architectural or micro-architectural features (e.g. datapath, registers, caches, TLBs, the MMU, memory controllers, out-of-order processing components such as register renaming or reorder buffers, etc.) of the target processing system. Instructions of the directed sequence make use of one or more micro-architectural components of the target processing system, thus allowing the functions of these components to be observed and compared with expected results. A directed sequence allows particular desired components to be tested; however, a downside of this approach is that some areas of these components may not be covered by the test. For example, when running the directed sequence of code, only the first few entries of a particular buffer, register or cache may be filled, and thus subsequent entries may not be tested. This may also mean that certain combinations of buffer, register or cache entries may not be tested.

According to some examples, the method of the present technique involves generating a test sequence of code to be run on a target processing system, based on one or more directed sequences of code, which are predetermined sequences of one or more directed instructions for testing predetermined parts of the target processing system. The test sequence of code is generated by inserting randomly selected instructions at one or more insertion points into a directed sequence of code.

The generated test sequence of code is a sequence of instructions generated according to the method described above, and designed to be run on target processing circuitry (the target processing system) to test micro-architectural components of the target processing system. Each insertion point in the directed sequence either precedes or follows a given instruction in the directed sequence of code (although there is not necessarily an insertion point before or after every instruction, for example in the case where two or more instructions are required to be performed sequentially), and the randomly selected instructions are selected according to some random parameter—it will be noted that, in this application, the term "random" is also intended to cover "pseudorandom," since in reality it may not be justified to incur the expense of providing a true random number generator—a pseudorandom number generator is sufficient.

Generating the test sequence of code based on both one or more directed sequences and on randomly selected instructions allows micro-architectural components of the target processing system to be better tested, as the random instructions ensure more variation in parameters such as cache allocation, buffer occupancy and so on, which can more realistically model expected behaviour during real processing. By inserting the randomly selected instructions into the directed sequence, an unpredictable (random) sequence of micro-architectural components can be tested, e.g. with an unpredictable assignment of cache/buffer entries for the instructions of the directed sequence. This reduces the likelihood that some regions of some micro-architectural features will be routinely missed by the test sequence of code, and also varies the possible combinations of cache and buffer entries to be tested. Furthermore, the test can be run multiple times with different patterns of instructions (e.g. different random insertions), reducing the chance that the test is passed for the directed sequence just because the test just happened to avoid probing the corner case which fails. Thus, the target processing system is more thoroughly tested, while still ensuring that particular desired micro-architectural components are tested.

In some examples, it is useful for the outcome of the directed sequence to be unaffected by the randomly selected instructions.

For example, the randomly selected instructions may be selected from instructions that fit certain criteria, such as instructions that will not cause a fault, do not require particular alignment instructions, and do not cause a base register or program counter to be updated. If the result of execution of the directed sequence of instructions is not an expected outcome, the tester may determine that the target processing system is faulty, which would be incorrect if the change of outcome is due to the insertion of the random instructions. Thus, ensuring that the randomly selected instructions do not affect the outcome of the directed sequence leads to a more accurate test of the target processing system being carried out.

In some examples, at least one of the following is selected based on at least one random number: instruction types of the randomly selected instructions, resources referenced by the randomly selected instructions, how many randomly selected instructions are inserted, and the insertion points at which the randomly selected instructions are inserted.

The at least one random number can be a random parameter generated according to any known technique, and it will be understood that the random number can be pseudorandom, as discussed above. The instruction types may include load/store instructions, arithmetic/logic instructions or any other type of instruction. Selecting one or more of the parameters listed above on the basis of a random parameter further increases the unpredictability of the usage of micro-architectural components acted on during the test, further improving the thoroughness of the test while still testing the predetermined micro-architectural features probed by the directed sequence.

In some examples, for each insertion point in the directed sequence of code, a number m of randomly selected instructions are inserted at that insertion point in the directed sequence of code, where m 0.

Thus, following the above method leads to a test sequence of code in which between zero and m randomly selected instructions are inserted at each insertion point in the directed sequence, where there may be an insertion point after each instruction in the directed sequence, or the insertion points may follow groups of two or more instructions. This leads to a more thorough test of the target processing system.

In some examples, resources to be used by the randomly selected instructions are selected such that it is ensured that they are different to the resources used by the instructions in the directed sequence of code.

This prevents the randomly selected instructions from affecting the outcome of the directed sequence of code, improving the accuracy of the test in a similar manner to that mentioned above.

In some examples, the resources to be used by the randomly selected instructions are selected based on at least one random number.

Thus, the resources tested by the test sequence of code are unpredictable, improving the thoroughness of the test. The random number is a randomly generated or randomly selected number (or a pseudorandom number).

In some examples, a list of resources used by the instructions in the directed sequence of code is generated prior to commencement of the insertion of randomly selected instructions into the directed sequence.

This allows resources to be chosen for the randomly selected instructions that will not conflict with those used by the instructions in the directed sequence, by consulting the generated list when choosing said resources. The list may be stored in a data storage location. A separate list may be generated for each directed sequence, or a single list may be generated for multiple directed sequences.

In some examples, a list of resources used by the instructions in the directed sequence of code is maintained, and when each instruction in the directed sequence is encountered, the list of resources is updated to include the resources used by this instruction.

This is another technique for ensuring that resources chosen for the randomly selected instructions do not conflict with those used for the instructions in the directed sequence. Maintaining such a list of resources "on the fly," as instructions are encountered or parsed, allows generation of the test sequence of code to commence even before all of the instructions in the directed sequence of code have been encountered. This increases the efficiency with the test sequence is generated.

In some examples, the resources used by either the randomly selected instructions or the instructions in the directed sequence of code comprise at least one of: a set of registers in the target processing system, and a set of memory locations in the target processing system.

In some examples, the randomly selected instructions are one of: a set of randomly generated instructions, and instructions randomly selected from a set of pre-programmed instructions.

Randomly generated instructions may be instructions generated according to any known technique, provided that they are generated based on at least one random parameter. The set of pre-programmed instructions could be instructions written by a programmer, or instructions written by a computer program or compiler.

In some examples, the instructions in the directed sequence of code are pre-programmed by one of: a programmer, a computer program and a compiler.

The instructions in the directed sequence are written such that they test a particular desired set of micro-architectural structures within the target processing system.

In some examples, randomly selected instructions are inserted before or after the directed sequence of code.

This further increases the unpredictability of micro-architectural operating parameters such as buffer occupancy, cache allocation, register pressure, etc., improving the test thoroughness further.

In some examples, the insertion of randomly selected instructions is performed during execution of the test sequence of code.

In such examples, the insertion of the randomly selected instructions is performed "on the fly," during execution of the test sequence by the target processing circuitry.

In some examples, a computer program is provided which, when executed on a computer, causes the computer to generate a test sequence of code to be run on a target processing system for use in testing the target processing system. The test sequence of code is based on one or more directed sequences of code, in which the one or more directed sequences of code are predetermined sequences of one or more directed instructions for testing predetermined parts of the target processing system, and the test sequence of code is generated by, for at least one of the one or more directed sequences of code, inserting randomly selected instructions at one or more insertion points in the directed sequence of code.

In some examples, a computer-readable storage medium for storing the above program is provided.

The storage medium may, for example, by a flash drive, a CD or DVD, or any other form of non-transitory storage.

In some examples an apparatus comprising test code generation circuitry is provided, in which the test code generation circuitry is arranged to perform the method described above.

Particular embodiments will now be described with reference to the figures.

Figure 1:
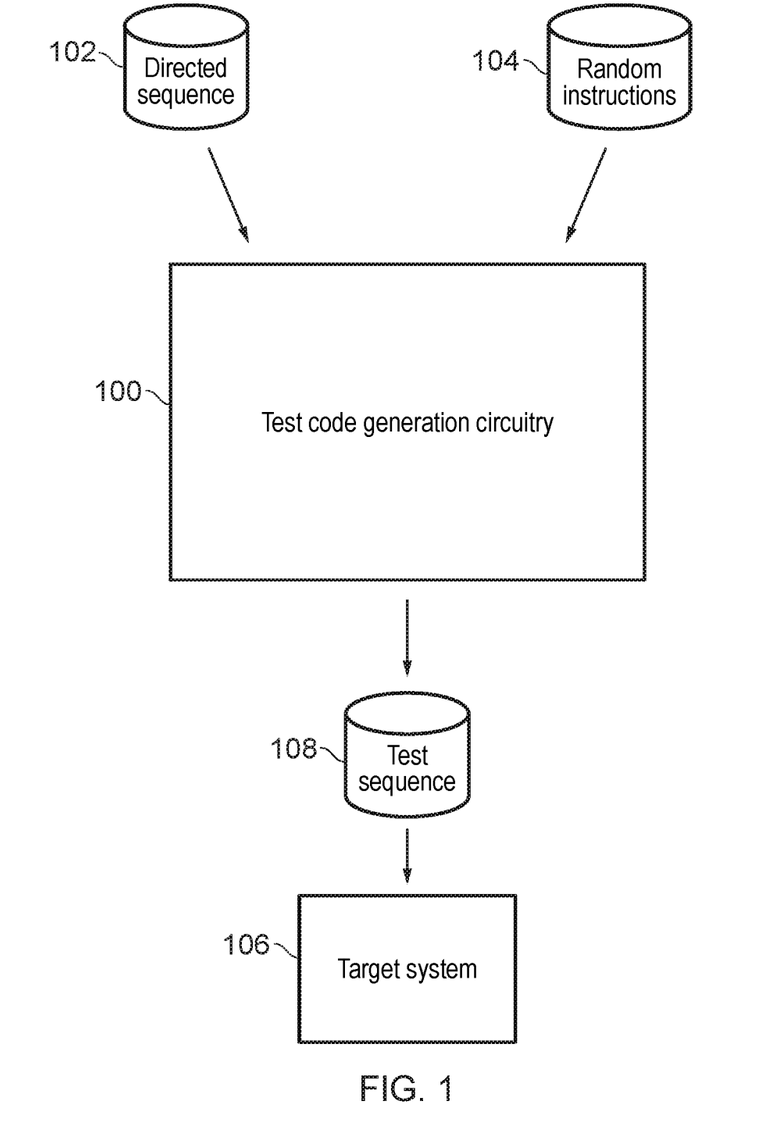
FIG. 1 is a schematic representation of a system on which the present technique may be implemented.

FIG. 1 is a schematic representation of a system on which the present technique could be implemented. In particular, FIG. 1 shows test code generation circuitry 100, which is configured to carry out the test code generation method described in this application.

The test code generation circuitry 100 takes, as inputs, at least one directed sequence of code 102 and a set of random instructions 104, where the random instructions 104 are one of a set of randomly selected instructions, and a set of candidate instructions available for random selection by the test code generation circuitry 100. The directed sequence of code 102 comprises a sequence of pre-programmed instructions designed to test a predetermined selection of micro-architectural features (e.g. registers, caches, memory locations, etc.) of the target system 106, which is processing circuitry configured to execute instructions. The directed sequence of instructions 102 may be written by a programmer or generated by a computer program, and is read from a storage medium by the test code generation circuitry 100. The random instructions 104 may be instructions selected from a predetermined set of instructions identified by a programmer, or they may instead be randomly generated instructions (where "random" should be taken to encompass "pseudorandom").

Based on these inputs, as will be explained in greater detail below, the test code generation circuitry 100 is configured to generate a test sequence of code 108 to be run on the target system 106 to test the target system 106.

Figure 2:
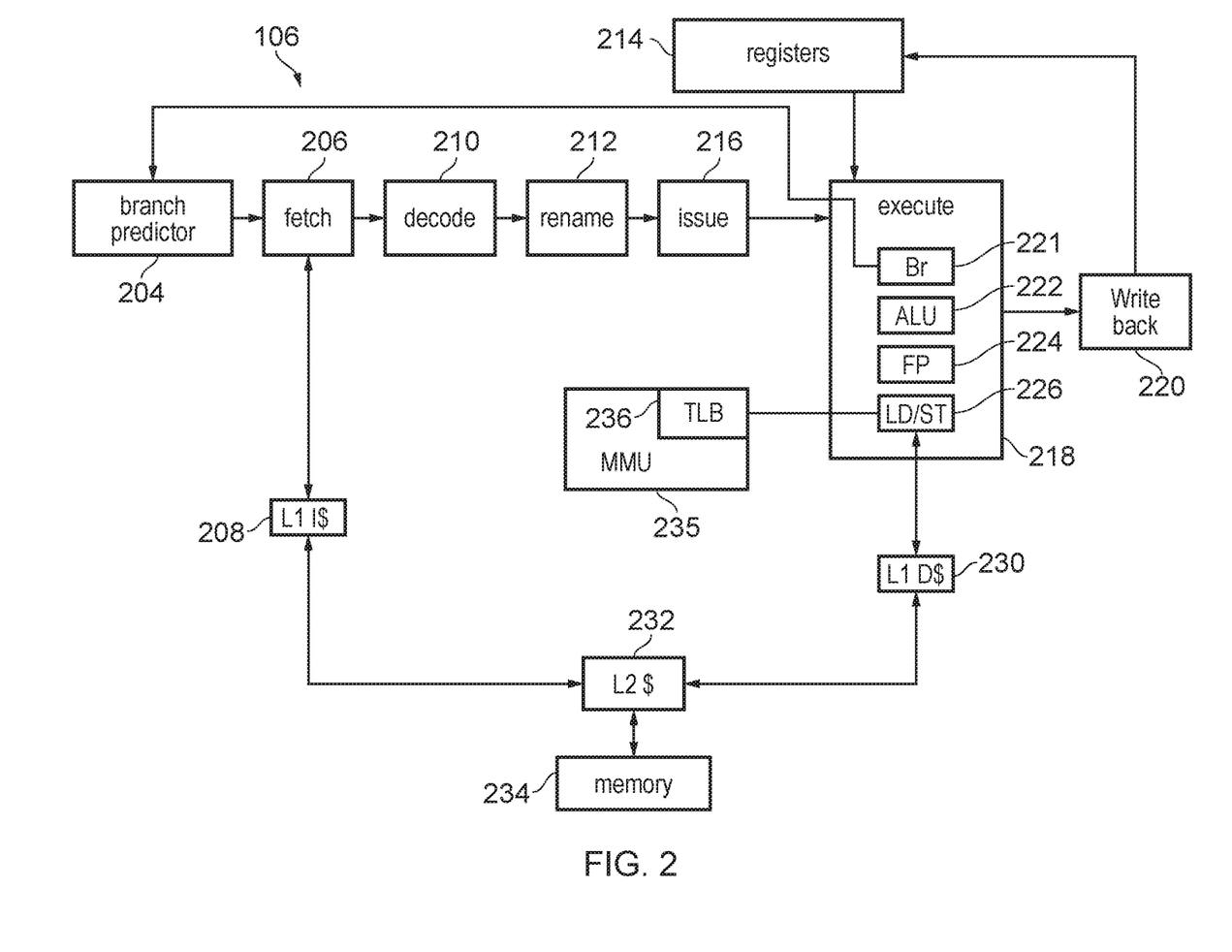
FIG. 2 is a schematic representation of an example of a target processing system which can be tested using a test sequence of code.

FIG. 2 schematically illustrates an example of a target data processing apparatus (target processing system) 106 having a processing pipeline comprising a number of pipeline stages. The pipeline includes a branch predictor 204 for predicting outcomes of branch instructions and generating a series of fetch addresses of instructions to be fetched.

The pipeline also includes a fetch unit 206, which fetches instructions from the instruction cache 208 or other memory structures 232, 234. The fetch stage 206 fetches the instructions identified by the fetch addresses, and a decode stage 210 decodes the fetched instructions to generate control information for controlling the subsequent stages of the pipeline.

A rename stage 212 performs register renaming to map architectural register specifiers identified by the instructions to physical register specifiers identifying registers 214 provided in hardware. An issue stage 216 includes an issue queue which queues instructions awaiting execution until the required operands for processing those instructions are available in the registers 214, and selection circuitry to select instructions for execution by the execute stage 218. The execute stage 218 executes the instructions to carry out corresponding processing operations, and a writeback stage 220 writes results of the executed instructions back to the registers 214.

The execute stage 218 may include a number of execution units such as a branch unit 221 for evaluating whether branch instructions have been correctly predicted, an ALU (arithmetic logic unit) 222 for performing arithmetic or logical operations, a floating-point unit 224 for performing operations using floating-point operands and a load/store unit 226 for performing load operations to load data from a memory system to the registers 214 or store operations to store data from the registers 214 to the memory system. In this example the memory system includes a level one instruction cache 208, a level one data cache 230, a level two cache 232 which is shared between data and instructions, and main memory 234, but it will be appreciated that this is just one example of a possible memory hierarchy and other implementations can have further levels of cache or a different arrangement. Access to memory may be controlled using a memory management unit (MMU) 235 for controlling address translation and/or memory protection. The load/store unit 226 may use a translation lookaside buffer 236 of the MMU 235 to map virtual addresses generated by the pipeline to physical addresses identifying locations within the memory system. It will be appreciated that the pipeline shown in FIG. 2 is just one example and other examples may have different sets of pipeline stages or execution units. For example, an in-order processor may not have a rename stage 212.

The target processing system 106 includes several micro-architectural components that can be tested using the test sequence of code 108 generated by the test code generation circuitry 100. These include the registers 214, the caches 208, 230, 232, the TLB 236, the MMU 235 and components in the memory system, such as coherent or non-coherent interconnects, snoop filters, memory controllers and buffers associated with any of these features.

Figure 3:
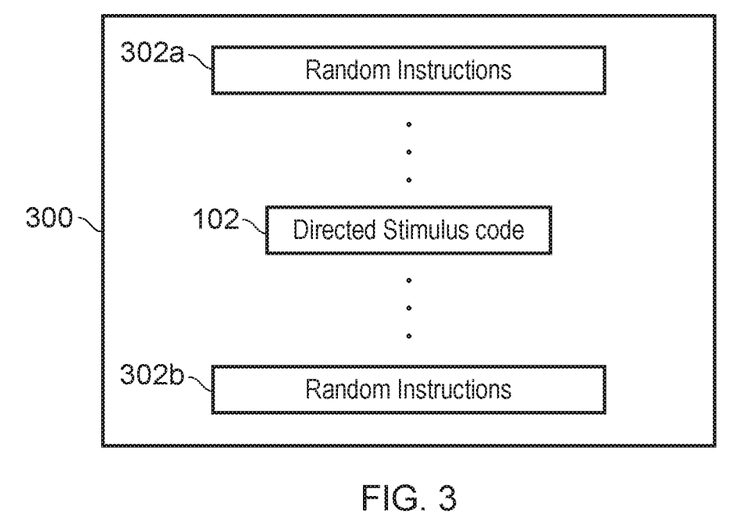
FIGS. 3 and 4 are schematic representations of examples of sections of test sequences of code.
Figure 4:
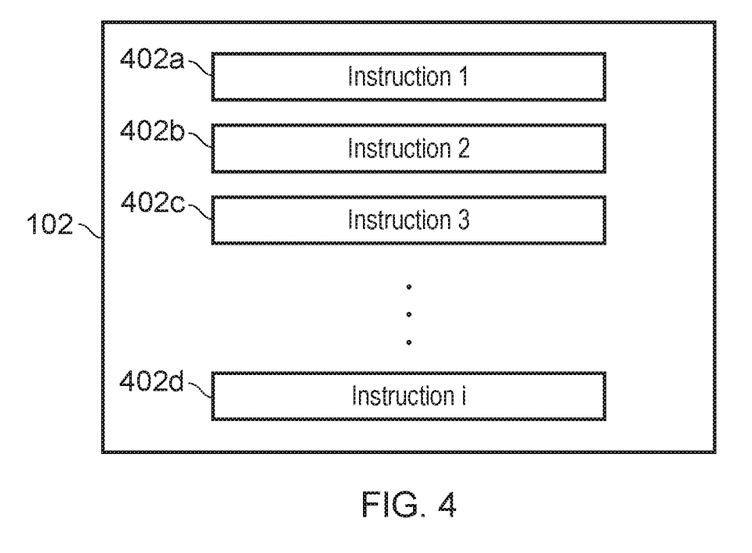

FIG. 3 shows a schematic representation of a sequence of instructions 300 that can be run on a target processing system 106 to test micro-architectural structures of the target processing system 106. The instruction sequence 300 includes a directed sequence of code 102—shown in more detail in FIG. 4, which demonstrates that the directed sequence of code 102 comprises a pre-programmed sequence of instructions 402—inserted into a sequence of randomly selected instructions 302. Combining a directed sequence of instructions 102 with a randomly selected set of instructions allows a particular set of micro-architectural components of the target system 106 to be tested, as well as a random population of caches, buffers and TLBs prior to executing the directed sequence, so that the micro-architectural features can be better probed. However, further improvements can be made to the test code 300 by implementing the method of the present technique.

Figure 5:
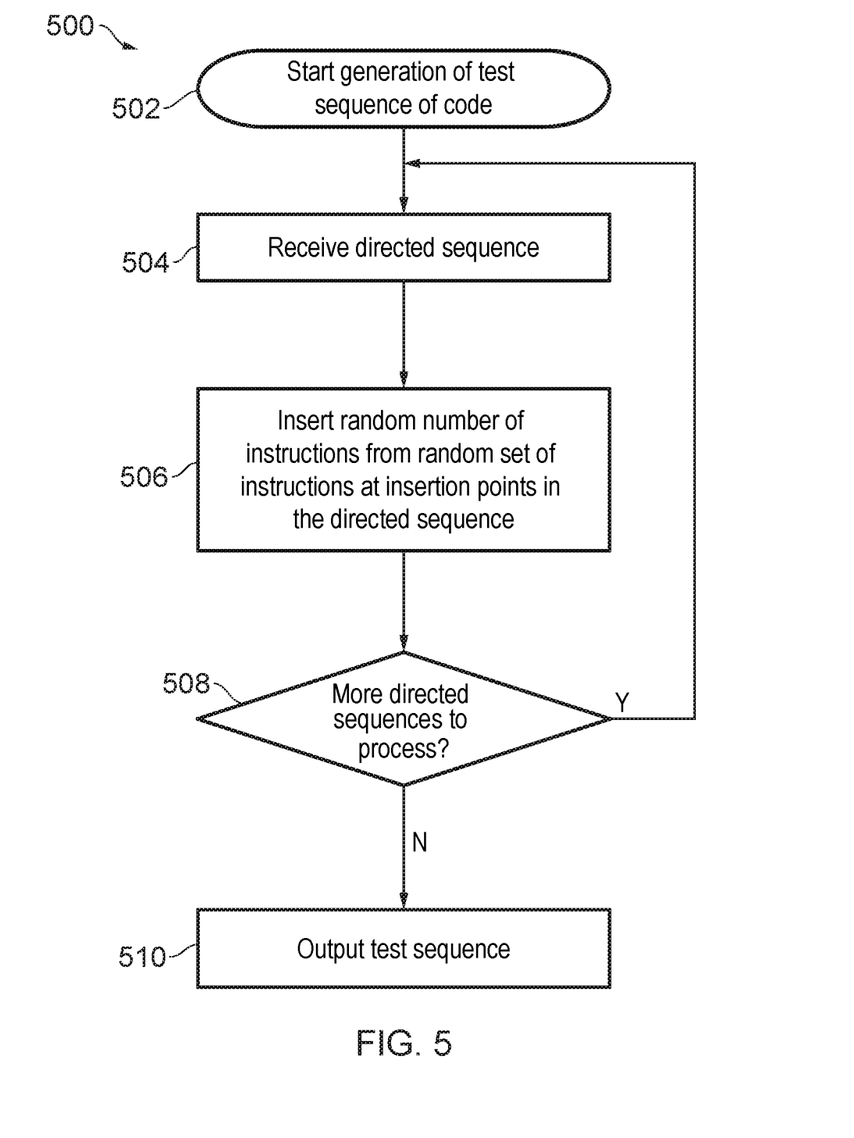
FIG. 5 is a flow diagram showing an example of a method of generating a test sequence of code.

FIG. 5 is a flow diagram showing an example of such a method for generating an improved test sequence of code 108 to be run on a target processing system 106 to test the target system 106. The test code generation method 500—which may be performed by test code generation circuitry 100—begins at step 502.

In step 504, a directed sequence of code 102 is received by the test code generation circuitry 100. The directed sequence of code 102 may be one of a plurality of directed sequences of code to be included in the test sequence of code 108, and the test sequence of code 108 may therefore be based on this plurality of directed sequences, or on just one directed sequence.

In step 506, a random number of instructions from a random set of instructions 104 are inserted into the directed sequence of code 102 and insertion points. The random number of instructions are randomly selected from the random set 104, and the insertion points are points in between instructions 402 in the directed sequence of code 102.

In step 508, it is determined whether or not there are any more directed sequences of code to process. If there are, then the method returns to step 504 and the next directed sequence of code is received. If not, the method continues to step 510, in which the test sequence of code 108 is output, to be run on the target processing circuitry.

Figure 6:
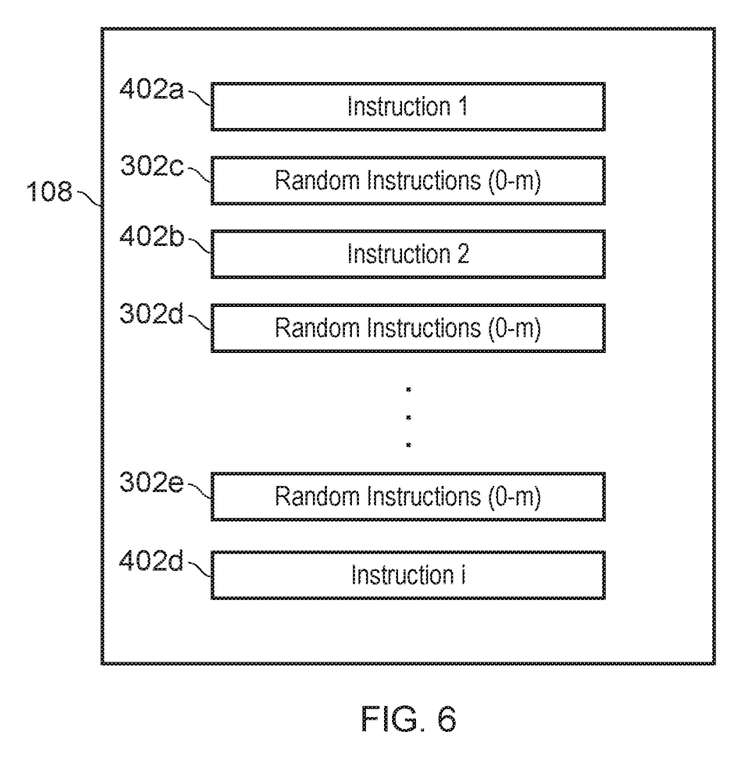
FIG. 6 is a schematic representation of a section of a test sequence of code.

FIG. 6 is a schematic representation of an example of a test sequence of code 108 generated by test code generation circuitry 100 according to the test code generation method 500 shown in FIG. 5.

The test sequence of code 108 includes the instructions 402 of the directed sequence of code 102. After some or all of the instructions 402 of the directed sequence of code 102 are insertion points, into which instructions 302 randomly selected from the set of random instructions 104 can be inserted. The test sequence of code 108 generated by the test code generation method 500 therefore includes between zero and m randomly selected instructions 302 after each instruction 402 in the directed sequence 102, where m is greater than or equal to zero.

A test sequence of code 108 as shown in FIG. 6 therefore enables a predetermined set of micro-architectural components of the target system 106 to be more thoroughly tested by the instructions 402 in the directed sequence of code 102, by stretching the processing capacity or resources used during execution of the test sequence 102 to create more realistic processing. The test is thus more likely to reach the limits of cache or buffer capacity (for example), leading to a better test of how the system will respond to realistic processing scenarios.

Figure 7:
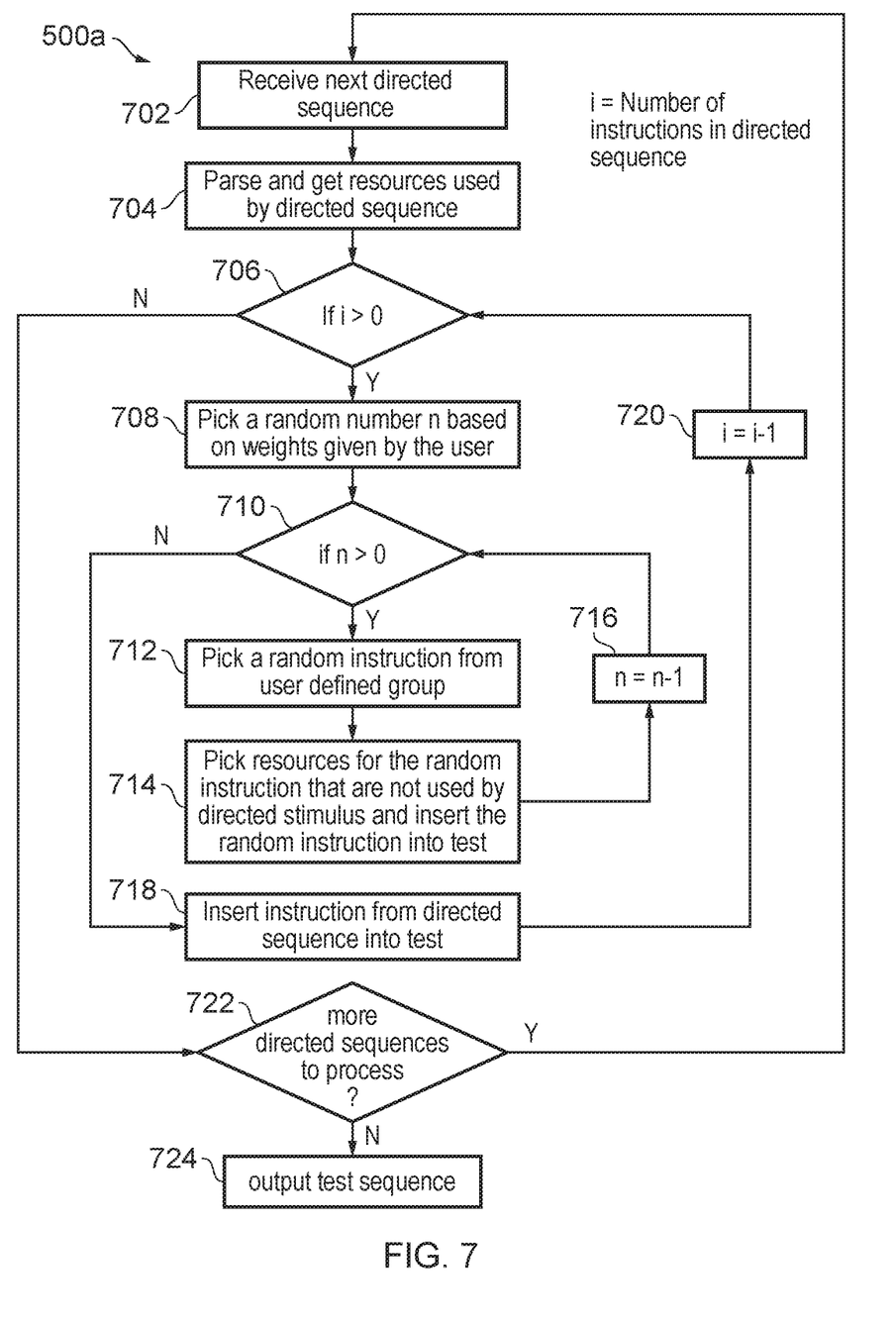
FIGS. 7 and 8 are flow diagrams showing examples of methods of generating a test sequence of code.

An example of a test code generation method 500a according to the present technique is shown in FIG. 7.

The method starts at step 702, in which a directed sequence of code 102 is received. In step 704, the directed sequence 102 is parsed to identify the resources used by instructions in the directed sequence 102. Although not shown in the figure, a list of the resources used by the directed sequence of code 102 may also be generated at this step.

In step 706, it is determined whether a number i—initially set to equal the number of instructions in the directed sequence of code 102—is greater than zero. If i is not greater than zero, the method proceeds to step 722, described later. On the other hand, if i is greater than zero, the method instead proceeds to step 708, in which a random number n is selected based on weights given by a user. It will be understood that the random number n is intended to cover a pseudorandom number. A user may specify weights such as a maximum number for n, a minimum number for n or any other weight that will affect the likelihood of a certain value of n being selected (e.g. lower values of n may be selected with a greater probability than higher values of n). The selection of n may be performed based on one or more random parameters (e.g. randomly generated numbers) and on the user-specified parameters.

In step 710, it is determined whether n is greater than zero. If n is not greater than zero, the method proceeds to step 718, which will be discussed later. If n is greater than zero, however, the method proceeds to step 712, in which an instruction is randomly selected from a set of instructions 104. In this example, the set of instructions from which the random instruction is selected is a user-defined set of instructions—for example, a user may specify a set of instructions that are non-faulting and will not cause updates to the base register or program counter. However, it should be noted that in other examples the set of instructions may instead be a set of randomly generated instructions.

In either example, in step 714, a set of resources (such as registers and memory locations) to be used by the randomly selected instructions is chosen. The resources chosen are different to those used by the directed sequence—if a list of resources was generated in the parsing step 704, resources not on this list are selected for the randomly selected instructions. Once a randomly selected instruction and a set of resources has been selected, the instruction is inserted into the test code 108.

In step 716, the value of n is reduced by 1 and the method returns to the step 710 of determining whether or not n is greater than zero.

When n is less than or equal to zero, the method proceeds to step 718, in which an instruction of the directed sequence is inserted into the test. In another step 720, the value of i is reduced by 1 and the method returns to the step 706 of determining whether or not i is greater than zero.

When i is equal to zero (note: the number of instructions in the directed sequence cannot be negative), the method proceeds to step 722, in which it is determined whether or not there are any more directed sequences to process. If there are more directed sequences to process, the method returns to the receiving step 702; if not, the method proceeds to step 724 in which the test sequence of code is output.

Figure 8:
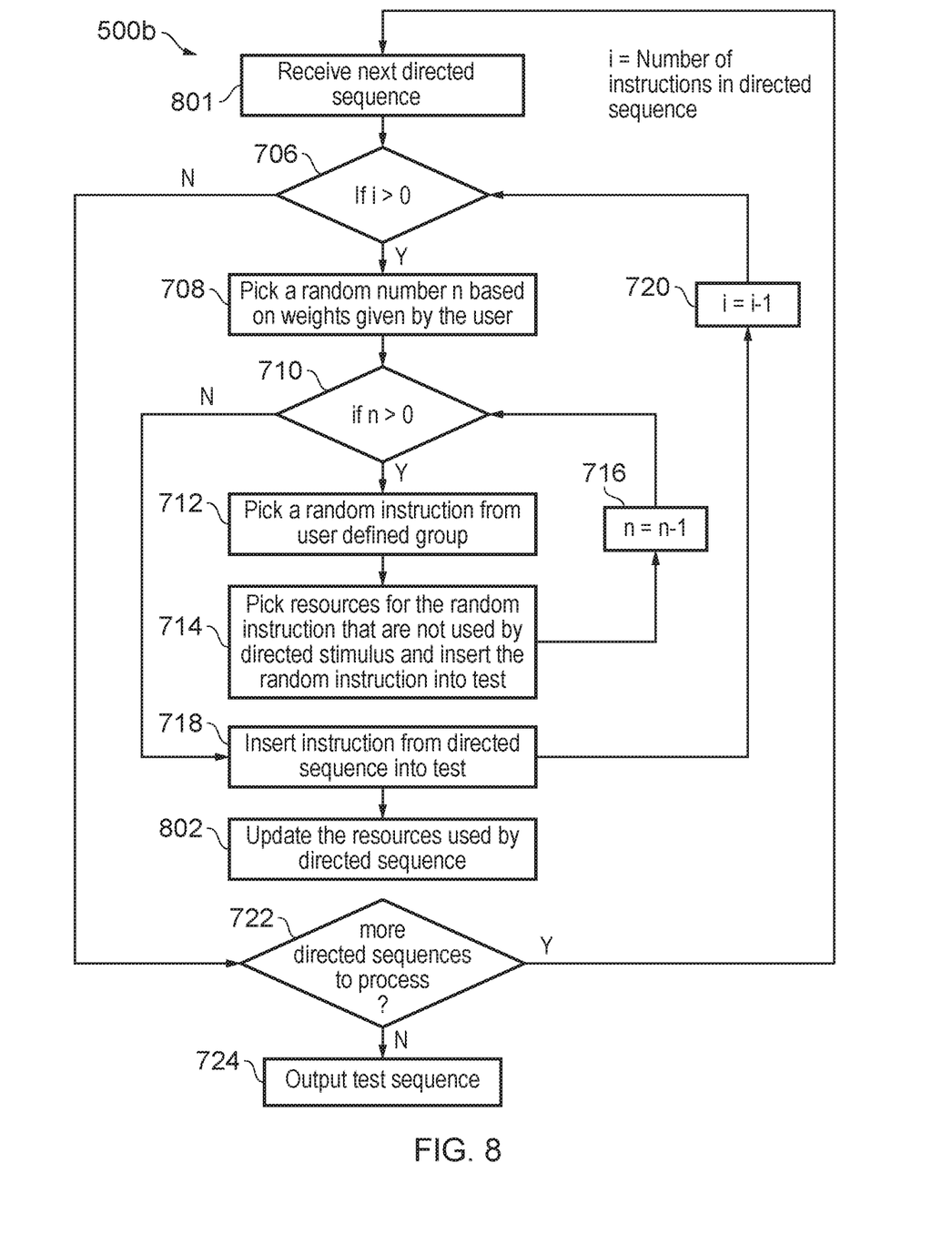

Turning now to FIG. 8, this figure shows a modification 500b of the method shown in FIG. 7 for generating a test sequence of code.

In this example, when a directed sequence of code 102 is received in step 801, a list is created for recording the resources used by the instructions in the directed sequence, but the list is not populated at this point.

The rest of the method 500b proceeds as in FIG. 7, except that for each instruction in the directed sequence, in step 802, the list of resources is updated to include the resources used by that instruction.

It should be noted that both the method 500a in FIG. 7 and the method 500b in FIG. 8 are examples of the present technique, and both provide the advantages of increasing the efficiency and accuracy of testing of a target processing system 106.

The method 500 described in FIGS. 5, 7 and 8 can also be implemented in software, in the form of a computer program—which may be stored on a non-transitory computer-readable storage medium such as a CD, DVD or flash drive. The computer program can be executed by a computer and, when executed, causes the computer to carry out a method 500 as described in the figures, to generate a test sequence of code 108 to be run on a target processing system 106.

The test sequence of instructions generated by the method discussed above can be stored on a storage medium, for later installation on the target processing system, so that when the test sequence is executed on the target processing system, the target processing system can be tested.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A method of generating a test sequence of code to be run on a target processing system for use in testing the target processing system, in which:
the test sequence of code is based on one or more directed sequences of code, in which the one or more directed sequences of code are predetermined sequences of one or more directed instructions for testing predetermined parts of the target processing system; and
the method comprises, for at least one of the one or more directed sequences of code:
inserting randomly selected instructions at one or more insertion points at intermediate locations within the directed sequence of code, each insertion point being between two instructions of the directed sequence, and the randomly selected instructions referencing resources comprising at least one of:
a set of registers in the target processing system; and
a set of memory locations in the target processing system;
selecting, based on at least one random number, at least one of:
instruction types of the randomly selected instructions, and
the registers and/or memory locations referenced by the randomly selected instructions; and
wherein the registers and/or memory locations referenced by the randomly selected instructions are selected to be different from the registers and/or memory locations used by the instructions in the directed sequence of code.

2. The method of claim 1, in which the outcome of the directed sequence is unaffected by the randomly selected instructions.

3. The method of claim 1, comprising selecting, based on said at least one random number, at least one of:
how many randomly selected instructions are inserted; and
the insertion points at which the randomly selected instructions are inserted.

4. The method of claim 1, comprising determining, for each instruction in the directed sequence, whether an insertion point is permitted after that instruction.

5. The method of claim 1, comprising, for each insertion point in the directed sequence of code, inserting m randomly selected instructions at that insertion point in the directed sequence of code, where m≥0.

6. The method of claim 1, in which the registers and/or memory locations to be used by the randomly selected instructions are selected based on said at least one random number.

7. The method of claim 1, comprising generating a list of resources used by the instructions in the directed sequence of code prior to commencing insertion of the randomly selected instructions in the directed sequence of code.

8. The method of claim 1, comprising:
maintaining a list of resources used by instructions in the directed sequence of code; and
when each instruction in the directed sequence of code is encountered, updating the list of resources to include the resources used by that instruction.

9. The method of claim 1, in which the randomly selected instructions are one of:
a set of randomly generated instructions; and
instructions randomly selected from a set of pre-programmed instructions.

10. The method of claim 1, in which the instructions in the directed sequence of code are pre-programmed instructions generated by one of:
a programmer;
a computer program; and
a compiler.

11. The method of claim 1, comprising, for at least one of the directed sequences, inserting randomly selected instructions before or after that directed sequence.

12. The method of claim 1, in which the insertion of the randomly selected instructions is performed during execution of the test sequence of code.

13. An apparatus comprising test code generation circuitry configured to perform the method of claim 1.

14. A non-transitory, computer-readable storage medium storing the test sequence of code generated by the method of claim 1.

15. The method of claim 1, further comprising:
for each instruction in the at least one of the one or more directed sequences of code, determining a random number n and inserting n randomly selected instructions into the directed sequence of code after that instruction.

16. The method of claim 15, in which
the random number n is determined based on weights given by a user.

17. A non-transitory, computer-readable storage medium storing a computer program, which when executed on a computer, causes the computer to generate a test sequence of code to be run on a target processing system for use in testing the target processing system, in which:
the test sequence of code is based on one or more directed sequences of code, in which the one or more directed sequences of code are predetermined sequences of one or more directed instructions for testing predetermined parts of the target processing system; and
the test sequence of code is generated by, for at least one of the one or more directed sequences of code:
inserting randomly selected instructions at one or more insertion points at intermediate locations within the directed sequence of code, each insertion point being between two instructions of the directed sequence, and the randomly selected instructions referencing resources comprising at least one of:
a set of registers in the target processing system; and a set of memory locations in the target processing system;

selecting, based on at least one random number, at least one of:

instruction types of the randomly selected instructions, and     the registers and/or memory locations referenced by the randomly selected instructions; and wherein the registers and/or memory locations referenced by the randomly selected instructions are selected to be different from the registers and/or memory locations used by the instructions in the directed sequence of code.

\* \* \* \* \*